(12) United States Patent
Ogawa et al.

(10) Patent No.: US 8,277,914 B2
(45) Date of Patent: Oct. 2, 2012

(54) POLYMER COMPOSITION AND USE THEREOF

(75) Inventors: Tokudai Ogawa, Tokyo (JP); Hiroaki Matsuda, Tokyo (JP)

(73) Assignee: Zeon Corporation, Tokyo (JP)

( * ) Notice: Subject to any disclaimer, the term of this patent is extended or adjusted under 35 U.S.C. 154(b) by 593 days.

(21) Appl. No.: 12/570,185

(22) Filed: Sep. 30, 2009

(65) Prior Publication Data

US 2010/0092712 A1     Apr. 15, 2010

Related U.S. Application Data

(63) Continuation-in-part of application No. PCT/JP2008/067712, filed on Sep. 30, 2008.

(60) Provisional application No. 61/101,364, filed on Sep. 30, 2008.

(30) Foreign Application Priority Data

Nov. 21, 2007  (JP) ................................. 2007-301525

(51) Int. Cl.
  *B32B 1/02*   (2006.01)
  *C08L 45/00*  (2006.01)
  *B32B 1/08*   (2006.01)

(52) U.S. Cl. ................... 428/36.92; 428/34.1; 428/34.2; 428/35.7; 428/35.9; 428/36.9; 525/210; 525/211

(58) Field of Classification Search ................. 428/34.1, 428/34.2, 35.7, 35.9, 36.9, 36.92; 525/210, 525/211

See application file for complete search history.

(56) References Cited

U.S. PATENT DOCUMENTS

| 5,087,677 A | 2/1992 | Brekner et al. |
| 8,053,531 B2 * | 11/2011 | Hirata et al. ............... 525/332.1 |
| 2004/0039122 A1 | 2/2004 | Morita et al. |

FOREIGN PATENT DOCUMENTS

| EP | 0407870 A2 | 1/1991 |
| EP | 0559146 A1 | 9/1993 |
| JP | 03-273043 A | 12/1991 |
| JP | 05-271482 A | 10/1993 |
| JP | 05-279554 A | 10/1993 |
| JP | 06-228380 A | 8/1994 |
| JP | 07-033962 A | 2/1995 |
| JP | 2002-249645 A | 9/2002 |
| JP | 2003-003048 A | 1/2003 |
| JP | 2003-139950 A | 5/2003 |
| JP | 2003-321591 A | 11/2003 |
| JP | 2007-016102 A | 1/2007 |
| JP | 2007-230016 A | 9/2007 |
| JP | 2007-230161 A | 9/2007 |
| JP | 2008-195890 A | 8/2008 |
| WO | 02/28966 A1 | 4/2002 |

OTHER PUBLICATIONS

European Search Report dated May 7, 2010, issued in corresponding European Patent Application No. 08852600.9.
International Search Report for PCT/JP2008/067712, mailing date of Dec. 22, 2008.

* cited by examiner

*Primary Examiner* — Marc Patterson
(74) *Attorney, Agent, or Firm* — Westerman, Hattori, Daniels & Adrian, LLP

(57) ABSTRACT

A polymer composition includes (1) a crystalline norbornene-based polymer and (2) an amorphous alicyclic structure-containing polymer in a weight ratio of 90:10 to 50:50, the crystalline norbornene-based polymer (1) having a melting point of 110 to 145° C., an Mw measured by gel permeation chromatography of 50,000 to 200,000, and a ratio Mw/Mn of 1.5 to 10.0, and obtained by ring-opening polymerization of a polymerizable monomer mixture (1) containing 90 to 100 wt % of 2-norbornene and 0 to 10 wt % of a substituent-containing norbornene monomer, and hydrogenating the resulting polymer, and the amorphous alicyclic structure-containing polymer (2) having a Tg of 50° C. or more and not having a melting point, and obtained by polymerization of a polymerizable monomer mixture (2) containing a 2-norbornene compound and a dicyclopentadiene compound in an amount of 50 wt % or more and less than 90 wt % in total. A film obtained by molding the polymer composition has a steam permeability of 0.40 g/m²·day or less and a haze value of 20% or less when the film has a thickness of 100 μm. A medical container is obtained by molding the polymer composition.

3 Claims, No Drawings

POLYMER COMPOSITION AND USE THEREOF

TECHNICAL FIELD

The present invention relates to a polymer composition suitable as a raw material for producing a transparent film or a medical container, a film obtained by molding the polymer composition and having excellent transparency and low steam permeability, and a medical container exhibiting low adsorptivity of a medicine contained therein, exhibiting only low elution of impurities, and rarely causing a change in the concentration of a packed medicine so that the composition of the medicine changes to only small extent.

BACKGROUND ART

Thermoplastic resins are classified into crystalline polymers with the region having a regular molecular structure and amorphous polymers having only a disorderly (amorphous) region. The crystalline polymers and the amorphous polymers have merits and demerits. For example, since a crystalline polyolefin resin has excellent chemical resistance, electric insulation properties, weather resistance, and the like, and has a light weight and low water absorption, the crystalline polyolefin resin is widely used in various applications. However, the crystalline polyolefin resin has a defect of a low heat distortion temperature under high load conditions due to high molding shrinkage and a comparatively low glass transition temperature. On the other hand, the amorphous polyolefin possesses excellent transparency and moisture-proof properties, but has problems of adhesion to a calendar roll and bubble formation in a sheet during press rolling film formation in a calendaring process which has high industrial productivity. Therefore, a method of improving properties of resin compositions by blending a crystalline polymer and an amorphous polymer has been studied.

For example, Patent Document 1 discloses a polymer composition comprising a crystalline polyolefin and an amorphous polyvinylcyclohexane resin which is one of the polymers containing an amorphous alicyclic structure. This polymer composition is described to attain outstanding heat resistance, rigidity, hardness, and small molding shrinkage, while maintaining the characteristics of the crystalline polyolefin resin.

Patent Document 2 describes that a sheet obtained from a resin composition containing an amorphous olefin having a heat distortion temperature of 100° C. or less, a high-density polyethylene, a fatty acid ester lubricant, and a fatty acid lubricant possesses high transparency and high moisture-proof properties. However, since the amorphous olefin and the high-density polyethylene do not have sufficient compatibility, the transparency of the sheet is limited.

Patent Document 3 discloses that a composition containing an amorphous alicyclic structure-containing polymer and a crystalline cycloolefin polymer can produce a molded product having improved transparency and solvent crack resistance by injection molding, compression molding, extrusion molding, or the like.

Glass, polyethylene, polypropylene, polyvinyl chloride resins, and the like have generally been used as materials for medical containers. However, glass may crack, is heavy, and may elute alkali ions and the like. Polyethylene and polypropylene have poor heat resistance, cannot be sterilized by steam, and may elute low molecular weight organic components. Polyvinyl chloride has poor heat resistance and may elute chlorine which may denature the content.

In order to improve these defects, Patent Document 4 proposes a medical container produced by using a thermoplastic norbornene resin having a glass transition temperature of 105° C. or more. However, the medical container does not have sufficiently low medicine adsorptivity and sufficient steam barrier properties, and may cause a change in the concentration of the packed medicine.

The composition disclosed in Patent Document 3 is described as being usable for medical containers.
Patent Document 1: JP-A-5-271482
Patent Document 2: JP-A-7-33962
Patent Document 3: JP-A-2007-016102
Patent Document 4: JP-A-5-317411 (EP559,146)

DISCLOSURE OF THE INVENTION

Problems to be Solved by the Invention

The inventors of the present invention conducted extensive studies, and found that a film produced by using a composition containing a crystalline cycloolefin polymer in an amount employed in the examples of Patent Document 3 does not exhibit a sufficiently low steam permeability. The inventors also found that a container produced by using the composition specifically disclosed in the examples of Patent Document 3 does not have sufficiently low medicine adsorptivity and sufficient steam barrier properties so that the concentration of the packed medicine may change.

The present invention was achieved in view of the above situation. An object of the present invention is to provide a polymer composition that is suitable as a raw material for producing a transparent film or a medical container, a film obtained by molding the polymer composition and having excellent transparency and low steam permeability, and a medical container exhibiting low adsorptivity of a medicine contained therein, exhibiting low elution of impurities, and rarely causing a change in the concentration of a packed medicine so that the composition of the medicine changes to only small extent.

Means for Solving the Problems

The inventors conducted extensive studies in order to achieve the above object. As a result, the inventors found that a polymer composition comprising (1) a crystalline norbornene-based polymer that is obtained by hydrogenating a ring-opening polymer which is obtained by ring-opening polymerization of a polymerizable monomer mixture containing 2-norbornene and a substituent-containing norbornene in a specific ratio, and (2) an amorphous alicyclic structure-containing polymer obtained by polymerization of a polymerizable monomer mixture containing a 2-norbornene compound and a dicyclopentadiene compound in an amount of 50 wt % or more in total in a specific ratio can produce a film having excellent transparency (low haze value) and low steam permeability as well as a container that exhibits low medicine adsorptivity and high steam barrier properties and does not cause a change in the concentration of the packed medicine. These findings have led to the completion of the present invention.

According to the first aspect of the present invention, there is provided a polymer composition comprising (1) a crystalline norbornene-based polymer and (2) an amorphous alicyclic structure-containing polymer in a weight ratio of 90:10 to 50:50, the crystalline norbornene-based polymer (1) having a melting point of 110 to 145° C., a weight average molecular weight measured by gel permeation chromatography of 50,000 to 200,000, and a ratio of the weight average molecular weight to the number average molecular weight of 1.5 to 10.0, and obtained by ring-opening polymerization of a polymerizable monomer mixture (1) comprising 90 to 100 wt % of 2-norbornene and 0 to 10 wt % of a substituent-containing norbornene monomer, and hydrogenating the resulting polymer, and the amorphous alicyclic structure-containing polymer (2) having a glass transition temperature of 50° C. or more and not having a melting point, and obtained by polymerization of a polymerizable monomer mixture (2) comprising a 2-norbornene compound and a dicyclopentadiene compound in an amount of 50 wt % or more and less than 90 wt % in total.

According to the second aspect of the present invention, there is provided a film obtained by molding the polymer composition according to the present invention, the film having a steam permeability of 0.40 g/m²·day or less and a haze value of 20% or less when the film has a thickness of 100 μm.

According to the third aspect of the present invention, there is provided a medical container obtained by molding the polymer composition according to the present invention.

BEST MODE FOR CARRYING OUT THE INVENTION

The present invention is described below in detail in the order of 1) a polymer composition, 2) a film, and 3) a medical container.

1) Polymer Composition

A polymer composition of the present invention comprises (1) a crystalline norbornene-based polymer and (2) an amorphous alicyclic structure-containing polymer in a weight ratio of 90:10 to 50:50, preferably 90:10 to 55:45, and more preferably 90:10 to 60:40. If the proportion of the crystalline norbornene-based polymer (1) is too large, transparency tends to decrease. If the proportion of the amorphous alicyclic structure-containing polymer (2) is too large, steam permeability tends to increase.

(1) Crystalline Norbornene-Based Polymer (1)

The crystalline norbornene-based polymer (1) used in the present invention is obtained by ring-opening polymerization of a polymerizable monomer mixture (1) containing 90 to 100 wt % of 2-norbornene (bicyclo[2.2.1]hept-2-ene) and 0 to 10 wt % of a substituent-containing norbornene monomer, and the following hydrogenation of the resulting polymer, the crystalline norbornene-based polymer (1) having a melting point of 110 to 145° C., a weight average molecular weight measured by gel permeation chromatography of 50,000 to 200,000, and a ratio of the weight average molecular weight to the number average molecular weight of 1.5 to 10.0. A crystalline norbornene-based polymer (1) obtained by hydrogenating 80% or more of carbon-carbon double bonds of the ring-opened polymer is particularly preferable.

2-Norbornene is a known compound, and may be obtained by reacting cyclopentadiene and ethylene, for example.

The substituent-containing norbornene monomer is a compound having a norbornene skeleton in the molecule (excluding 2-norbornene). The term "substituent-containing norbornene monomer" used in the present invention includes norbornene compounds having a condensed ring in addition to 2-norbornene derivatives having a substituent.

As examples of the substituent-containing norbornene monomer, a norbornene monomer not containing a ring condensable with a norbornene ring in the molecule, a polycyclic norbornene monomer having three or more rings, and the like can be given.

Specific examples of the norbornene monomer not containing a ring condensable with a norbornene ring in the molecule include norbornenes having an alkyl group such as 5-methyl-bicyclo[2.2.1]hept-2-ene (5-methyl-2-norbornene), 5-ethyl-bicyclo[2.2.1]hept-2-ene, 5-butyl-bicyclo[2.2.1]hept-2-ene, 5-hexyl-bicyclo[2.2.1]hept-2-ene, 5-decyl-bicyclo[2.2.1]hept-2-ene, 5-cyclohexyl-bicyclo[2.2.1]hept-2-ene, and 5-cyclopentyl-bicyclo[2.2.1]hept-2-ene; norbornenes having an alkenyl group such as 5-ethylidene-bicyclo[2.2.1]hept-2-ene (5-ethylidene-2-norbornene), 5-vinyl-bicyclo[2.2.1]hept-2-ene, 5-propenyl-bicyclo[2.2.1]hept-2-ene, 5-cyclohexenyl-bicyclo[2.2.1]hept-2-ene, and 5-cyclopentenyl-bicyclo[2.2.1]hept-2-ene;

norbornenes having an aromatic group such as 5-phenyl-bicyclo[2.2.1]hept-2-ene (5-phenyl-2-norbornene);

norbornenes having an oxygen-containing polar group such as 5-methoxycarbonyl-bicyclo[2.2.1]hept-2-ene (5-methoxycarbonyl-2-norbornene), 5-ethoxycarbonyl-bicyclo[2.2.1]hept-2-ene, 5-methyl-5-methoxycarbonyl-bicyclo[2.2.1]hept-2-ene, 5-ethoxycarbonyl-5-methyl-bicyclo[2.2.1]hept-2-ene, 5-hydroxy-bicyclo[2.2.1]hept-2-ene 2-methylpropionate, 5-hydroxy-bicyclo[2.2.1]hept-2-ene 2-methyloctanoate, 5-hydroxymethyl-bicyclo[2.2.1]hept-2-ene, 5,6-di(hydroxymethyl)-bicyclo[2.2.1]hept-2-ene, 5,5-di(hydroxymethyl)-bicyclo[2.2.1]hept-2-ene, 5-hydroxyisopropyl-bicyclo[2.2.1]hept-2-ene, 5,6-dicarboxy-bicyclo[2.2.1]hept-2-ene, and 6-carboxy-5-methoxycarbonyl-bicyclo[2.2.1]hept-2-ene;

norbornenes having a nitrogen atom-containing polar group such as 5-cyano-bicyclo[2.2.1]hept-2-ene, and 6-carboxy-5-cyano-bicyclo[2.2.1]hept-2-ene; and the like.

The polycyclic norbornene monomer having three or more rings refers to a norbornene monomer having a norbornene ring and one or more rings condensed with the norbornene ring in the molecule. As specific examples, monomers shown by the following formula (1) or (2) can be given.

wherein $R^1$ and $R^2$ individually represent a hydrogen atom, a halogen atom, a substituted or unsubstituted hydrocarbon group having 1 to 20 carbon atoms, or a substituent containing a silicon atom, an oxygen atom, or a nitrogen atom, provided that $R^1$ and $R^2$ may bond together to form a ring, and $R^3$ represents a substituted or unsubstituted divalent hydrocarbon group having 1 to 20 carbon atoms.

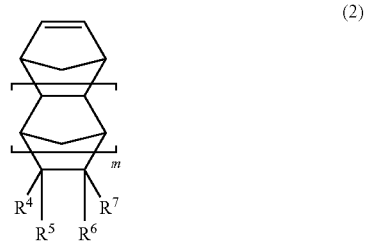

wherein $R^4$ to $R^2$ individually represent a hydrogen atom, a halogen atom, a substituted or unsubstituted hydrocarbon group having 1 to 20 carbon atoms, or a substituent containing a silicon atom, an oxygen atom or a nitrogen atom, provided that $R^4$ and $R^6$ may bond together to form a ring, and m is 1 or 2.

As specific examples of the monomer shown by the formula (1), dicyclopentadienes shown by the following formula (3) such as tricyclo[4.3.0.1²,⁵]deca-3,7-dien (trivial name: dicyclopentadiene), methyldicyclopentadiene, and dimethyldicyclopentadiene can be given. Norbornene derivatives having an aromatic ring shown by the following formula (4) such as tetracyclo[9.2.1.0²,¹⁰.0³,⁸]tetradeca-3,5,7,12-tetraene (also called 1,4-methano-1,4,4a,9a-tetrahydro-9H-fluorene) and tetracyclo[10.2.1.0²,¹⁰.0⁴,⁹]pentadeca-4,6,8,13-tetraene (also called 1,4-methano-1,4,4a,9,9a,10-hexahydroanthracene) can also be given.

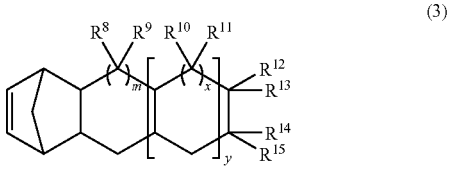

(3)

wherein m, x, and y individually represent 0, 1, or 2; $R^8$ to $R^{15}$ individually represent a hydrogen atom, a hydrocarbon group, a halogen atom, a hydroxyl group, an ester group, an alkoxy group, a cyano group, an amide group, an imide group, a silyl group, or a hydrocarbon group substituted with a polar group such as a halogen atom, a hydroxyl group, an ester group, an alkoxy group, a cyano group, an amide group, an imide group, or a silyl group; $R^{12}$ to $R^{15}$ may be bonded in any optional combination to form a carbon-carbon unsaturated bond, a monocyclic group, or a polycyclic group, and $R^{12}$ and $R^{13}$ or $R^{14}$ and $R^{15}$ may form an alkylidene group in combination.

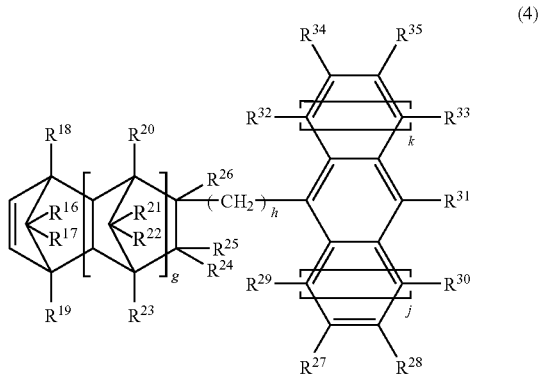

(4)

wherein g, h, j, and k individually represent 0, 1, or 2; $R^{16}$ to $R^{35}$ individually represent a hydrogen atom, a hydrocarbon group, a halogen atom, a hydroxyl group, an ester group, an alkoxy group, a cyano group, an amide group, an imide group, a silyl group, or a hydrocarbon group substituted with a polar group such as a halogen atom, a hydroxyl group, an ester group, an alkoxy group, a cyano group, an amide group, an imide group, or a silyl group; the carbon atom to which $R^{24}$ and $R^{25}$ bond and the carbon atom to which $R^{29}$ bonds or the carbon atom to which $R^{27}$ bonds may bond directly or via an alkylene group having 1 to 3 carbon atoms; and when j=k=0, $R^{31}$ and $R^{28}$ or $R^{31}$ and $R^{35}$ may bond to form a monocyclic or polycyclic aromatic ring.

As the hydrocarbon group represented by $R^8$ to $R^{35}$, those having 1 to 20 carbon atoms, preferably 1 to 10 carbon atoms, and more preferably 1 to 6 carbon atoms can be given. As specific examples, alkyl groups having 1 to 6 carbon atoms such as a methyl group, an ethyl group, and a propyl group; alkenyl groups having 2 to 6 carbon atoms such as a vinyl group, a propenyl group, and a crotyl group; alkynyl groups having 2 to 6 carbon atoms such as an ethynyl group, a propargyl group, and a 3-butynyl group; substituted or unsubstituted aryl groups having 6 to 20 carbon atoms such as a phenyl group, a 4-methylphenyl group, or a 2-naphthyl group; cycloalkyl groups having 3 to 8 carbon atoms such as a cyclopropyl group, a cyclopentyl group, and a cyclohexyl group can be given.

As examples of the halogen atom represented by $R^8$ to $R^{35}$, a fluorine atom, a chlorine atom, and a bromine atom can be given.

As examples of the ester group represented by $R^8$ to $R^{35}$, alkoxycarbonyl groups having 2 to 20 carbon atoms such as a methoxycarbonyl group, an ethoxycarbonyl group, and a t-butoxycarbonyl group can be given.

As examples of the alkoxy group represented by $R^8$ to $R^{35}$, alkoxy groups having 1 to 20 carbon atoms such as a methoxy group, an ethoxy group, and a propoxy group can be given.

As examples of the silyl group represented by $R^8$ to $R^{35}$, a trimethylsilyl group, a triethylsilyl group, a dimethylphenylsilyl group, a diphenylmethylsilyl group, and a t-butyldimethylsilyl group can be given.

As examples of the alkylidene group formed by $R^{12}$ and $R^{13}$ or $R^{14}$ and $R^{15}$, a methylidene group, an ethylidene group, a propylidene group, and an isopropylidene group can be given.

As examples of the monomer shown by the formula (2), tetracyclododecenes which are compounds of the formula (2) in which m=1 and hexacycloheptadecenes which are compounds of the formula (2) in which m=2 can be given.

As specific examples of tetracyclododecenes, tetracyclododecenes unsubstituted or substituted with an alkyl group such as tetracyclododecene, 8-methyltetracyclododecene, 8-ethyltetracyclododecene, 8-cyclohexyltetracyclododecene, and 8-cyclopentyltetracyclododecene; tetracyclododecenes having a double bond outside of the ring such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; tetracyclododecenes having an aromatic ring such as 8-phenyltetracyclododecene; tetracyclododecenes having an oxygen-containing substituent such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic acid anhydride; tetracyclododecenes having a nitrogen-containing substituent such as 8-cyanotetracyclododecene and tetracyclododecene-8,9-dicarboxylic acid imide; tetracyclododecenes having a halogen-containing substituent such as 8-chlorotetracyclododecene; and tetracyclododecenes having a silicon-containing substituent such as 8-trimethoxysilyltetracyclododecene can be given.

As specific examples of hexacycloheptadecenes, hexacycloheptadecenes unsubstituted or substituted with an alkyl group such as hexacycloheptadecene, 12-methylhexacycloheptadecene, 12-ethylhexacycloheptadecene, 12-cyclohexylhexacycloheptadecene, and 12-cyclopentylhexacycloheptadecene; hexacycloheptadecenes having a double bond outside of the ring such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene; hexacycloheptadecenes having an aromatic ring such as 12-phenylhexacycloheptadecene; hexacycloheptadecenes having an oxygen-containing substituent such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid, and hexacycloheptadecene-12,13-dicarboxylic acid anhydride; hexacycloheptadecenes having a nitrogen-containing substituent such as 12-cyanohexacycloheptadecene and hexacycloheptadecene-12,13-dicarboxylic acid imide; hexacycloheptadecenes having a halogen-containing substituent such as 12-chlorohexacycloheptadecene; and hexacycloheptadecenes having a silicon-containing substituent such as 12-trimethoxysilylhexacycloheptadecene can be given. These norbornene monomers may be used either individually or in combination of two or more.

In the present invention, a monomer mixture containing other monomers copolymerizable with 2-norbornene and the substituent-containing norbornene monomer by ring-opening copolymerization may be used as the polymerizable monomer mixture (1).

As examples of the other monomer which can be used, monocycloolefins such as cyclohexene, cycloheptene, and cyclooctene, and derivatives thereof; cyclic dienes such as cyclohexadiene and cycloheptadiene, and derivatives thereof; and the like can be given.

The content of 2-norbornene in the polymerizable monomer mixture (1) is usually 90 to 100 wt %, preferably 95 to 99 wt %, and more preferably 97 to 99 wt %. The content of substituent group-containing norbornene in the polymerizable monomer is usually 0 to 10 wt %, preferably 1 to 5 wt %, and more preferably 1 to 4 wt %.

The content of the other monomers copolymerizable by ring-opening polymerization in the polymerizable monomer mixture (1) is usually 0 to 10 wt %, and preferably 0 to 2 wt %.

A 2-norbornene homopolymer or a ring-opened copolymer of 2-norbornene and a substituent-containing norbornene based monomer can be obtained by ring-opening polymerization of 2-norbornene or a mixture of 2-norbornene and a substituent-containing norbornene based monomer and optionally used other monomers in the presence of a metathesis polymerization catalyst.

As the metathesis polymerization catalyst, a metathesis polymerization catalyst which essentially consists of (a) a transition metal compound catalyst component and (b) a metallic compound co-catalyst component described in JP-B-41-20111, JP-A-46-14910, JP-B-57-17883, JP-B-57-61044, JP-A-54-86600, JP-A-58-127728, and JP-A-1-240517; a living ring-opening metathesis catalyst such as Schrock-type polymerization catalyst (JP-A-7-179575, Schrock et al., J. Am. Chem. Soc., 1990, vol. 112, from page 3875, etc.), Grubbs type polymerization catalyst (Fu et al., J. Am. Chem. Soc., 1993, Vol. 115, from page 9856; Nguyen et al., J. Am. Chem. Soc., 1992, vol. 114, from page 3974; Grubbs et al., WO 98/21214, etc.); and the like can be given.

In order to control the molecular weight distribution of the resulting polymer in a suitable range, a metathesis polymerization catalyst comprising (a) a transition metal compound catalyst component and (b) a metallic compound co-catalyst component is preferable among these catalysts.

The transition metal compound catalyst components (a) are transition metal compounds of the groups 3 to 11 of the Periodic Table. As examples of the specific transition metal compound, a halide, an oxyhalide, an alkoxyhalide, an alkoxide, a carbonate, an (oxy)acetylacetonate, a carbonyl complex, an acetonitrile complex, and an hydride complex of these transition metals, and derivatives of these compounds, as well as a complex compound derived from the reaction of these transition metal compounds or derivatives thereof and a complexing agent such as $P(C_6H_5)_5$, can be given.

As specific examples, $TiCl_4$, $TiBr_4$, $VOCl_3$, $WBr_3$, $WCl_6$, $WOCl_4$, $MoCl_5$, $MoOCl_4$, $WO_2$, and $H_2WO_4$ can be given. Among these compounds, compounds of W, Mo, Ti, or V are preferable, particularly a halide, an oxyhalide, or an alkoxyhalide of W, Mo, Ti, or V are preferable from the viewpoint of polymerization activity.

The metallic compound co-catalyst component (b) is a compound of a metal belonging to the groups 1 to 2 and the groups 12 to 14 of the Periodic Table having at least one metal element-carbon atom bond or at least one metal element-hydrogen bond. For example, an organic compound of Al, Sn, Li, Na, Mg, Zn, Cd, and B can be given.

As specific examples, organoaluminum compounds such as trimethylaluminum, triisobutylaluminum, diethylaluminum monochloride, methylaluminum sesquichloride, and ethylaluminum dichloride; organotin compounds such as tetramethyltin, diethyldimethyltin, tetrabutyltin, and tetraphenyltin; organolithium compounds such as n-butyllithium; organosodium compounds such as n-pentylsodium; organomagnesium compounds such as methylmagnesium iodide; organozinc compounds such as diethylzinc; organocadmium compounds such as diethyl cadmium; and organoboron compounds such as trimethylboron can be given. Of these, compounds of elements belonging to the group 13, particularly organoaluminum compounds of Al, are preferable.

It is possible to increase the metathesis polymerization activity by adding a third component in addition to the component (a) and the component (b). Examples of the third component used include aliphatic tertiary amines, aromatic tertiary amines, molecular oxygen, alcohols, ethers, peroxides, carboxylic acids, acid anhydrides, acid chlorides, esters, ketones, nitrogen-containing compounds, halogen-containing compounds, and other Lewis acids.

The ratio of the component (a) to the component (b), in terms of molar ratio of metals, is usually in a range of 1:1 to 1:100, and preferably 1:2 to 1:10. The molar ratio of the component (a) to the third component is usually in a range of 1:0.005 to 1:50, and preferably 1:1 to 1:10.

The amount of the polymerization catalyst used, in terms of molar ratio of the transition metals in the polymerization catalyst to the total amount of monomers, is usually 1:100 to 1:2,000,000, preferably 1:1,000 to 1:20,000, and more preferably 1:5,000 to 1:8,000. If the amount of the catalyst is too large, the catalyst removal after the polymerization reaction will become difficult and there is a possibility that the molecular weight distribution may be broadened. If too small, sufficient polymerization activity may not be obtained.

It is preferable to carry out the ring-opening polymerization in an appropriate solvent, although a non-solvent reaction is possible. There are no specific limitations to the organic solvent used insofar as the solvent can dissolve or disperse the polymer or the hydrogenated polymer and does not affect the polymerization reaction and the hydrogenation reaction. An industrially available common solvent is preferable.

As specific examples of such an organic solvent, aliphatic hydrocarbons such as pentane, hexane, and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene cyclohexane, and cyclooctane; aromatic hydrocarbons such as benzene, toluene, and xylene; halogen-containing aliphatic hydrocarbons such as dichloromethane, chloroform, and 1,2-dichloroethane; halogen-containing aromatic hydrocarbons such as chlorobenzene and dichlorobenzene; nitrogen-containing hydrocarbons such as nitromethane, nitrobenzene, and acetonitrile; ethers such as diethyl ether and tetrahydrofuran; and the like can be given. These organic solvents may be used either individually or in combination of two or more.

Of these, the aromatic hydrocarbons, aliphatic hydrocarbons, alicyclic hydrocarbons, and ethers widely used in the industrial field are preferable.

When the ring-opening polymerization is carried out in an organic solvent, the monomer concentration is preferably 1 to 50 wt %, more preferably 2 to 45 wt %, and particularly preferably 3 to 40 wt %. If the concentration of the monomer mixture is less than 1 wt %, the productivity may be reduced; if more than 50 wt %, the solution viscosity after the polymerization is too high, and there is a possibility that the subsequent hydrogenation reaction may become difficult.

It is possible to add a molecular weight controlling agent to the ring-opening polymerization reaction system. The molecular weight of the ring-opened polymer may be adjusted by adding a molecular weight controlling agent.

Any molecular weight controlling agent conventionally used may be used without a particular limitation. As examples, α-olefins such as 1-butene, 1-pentene, 1-hexene, and 1-octene; styrenes such as styrene and vinyltoluene; ethers such as ethyl vinyl ether, isobutyl vinyl ether, and allyl glycidyl ether; halogen-containing vinyl compounds such as arylchloride; oxygen-containing vinyl compounds such as glycidyl methacrylate; nitrogen-containing vinyl compounds such as acrylamide; nonconjugated dienes such as 1,4-pentadiene, 1,4-hexadiene, 1,5-hexadiene, 1,6-heptadiene, 2-methyl-1,4-pentadiene, and 2,5-dimethyl-1,5-hexadiene; conjugated dienes such as 1,3-butadiene, 2-methyl-1,3-butadiene, 2,3-dimethyl-1,3-butadiene, 1,3-pentadiene, and 1,3-hexadiene can be given. Of these, α-olefins are preferable due to their capability of easily adjusting the molecular weight.

The amount of the molecular weight controlling agent may be the amount by which polymers with a desired molecular weight can be obtained. Such an amount, in terms of the molar ratio of the molecular weight controlling agent to the total amount of all monomers used, may be usually 1:50 to 1:1,000,000, preferably 1:100 to 1:5,000, and more preferably 1:300 to 1:3,000.

The ring-opening polymerization reaction is initiated by mixing the polymerizable monomers with the polymerization catalyst.

Although not particularly limited, the polymerization temperature is usually −20° C. to +100° C., and preferably 10° C. to 80° C. If the temperature of the polymerization reaction is too low, the reaction rate may be reduced. When the polymerization temperature is too high, there is a possibility that the molecular weight distribution may be broadened by side reactions.

Although not particularly limited, the polymerization reaction time is usually from one minute to 100 hours.

The pressure conditions during the polymerization are also not particularly limited. When the polymerization is carried out under pressure, the pressure applied is usually 1 MPa or less.

After completion of the reaction, the target ring-opened polymer of norbornene monomers can be isolated by a common post treatment.

The resulting ring-opened polymer of norbornene monomers is supplied to the next hydrogenation reaction step.

The hydrogenation reaction may also be continuously performed by adding a hydrogenation catalyst to the ring-opening polymerization reaction solution without isolating the ring-opened polymer of norbornene monomers as later described.

The hydrogenation reaction of the ring-opened polymer of norbornene monomers is a reaction of adding hydrogen to the carbon-carbon double bonds in the main chain and/or the side chain of the ring-opened polymer of norbornene monomers. The hydrogenation reaction is carried out by adding a hydrogenation catalyst to a solution of the ring-opened polymer of norbornene monomers in an inert solvent while supplying hydrogen to the reaction system.

Any hydrogenation catalyst commonly used for hydrogenating olefin compounds may be used without specific limitations. The catalyst may be either a homogeneous catalyst or a heterogeneous catalyst. A heterogeneous catalyst is preferred when removal of metals from the resulting polymer or the like is considered.

As the homogeneous catalysts, a catalyst system consisting of a combination of a transition metal compound and an alkali metal compound, for example, cobalt acetate and triethylaluminum, nickel acetylacetonate and triisobutylaluminum, titanocene dichloride and n-butyllithium, zirconocene dichloride and sec-butyllithium, and tetrabutoxy titanate and dimethyl magnesium; a noble metal complex catalyst such as dichlorobis(triphenylphosphine)palladium, chlorohydridecarbonyl tris(triphenylphosphine)ruthenium, chlorotris(triphenylphosphine)rhodium, and bis(tricyclohexylphosphine)benzylidyne ruthenium (IV) dichloride; and the like can be given.

As the heterogeneous catalysts, nickel, palladium, platinum, rhodium, and ruthenium, or solid catalysts with these metals supported on a carrier such as carbon, silica, diatomaceous earth, alumina, or titania, for example, nickel on silica, nickel on diatomaceous earth, nickel on alumina, palladium on carbon, palladium on silica, palladium on diatomaceous earth, and palladium on alumina can be given.

The amount of the catalyst used is usually 0.05 to 10 parts by weight for 100 parts by weight of the ring-opened polymer of norbornene monomers.

As the inert organic solvent used for the hydrogenation reaction, the same organic solvents as previously mentioned in connection with the ring-opening polymerization of 2-norbornene and substituent-containing norbornene monomers such as aliphatic hydrocarbons, alicyclic hydrocarbons, aromatic hydrocarbons, halogenated aromatic hydrocarbons, nitrogen-containing hydrocarbons, and ethers can be given.

The hydrogenation reaction temperature varies according to the hydrogenation catalyst used. The reaction temperature is usually from −20 to +300° C., and preferably from 0 to +250° C. If the hydrogenation temperature is too low, the reaction speed may be slow; if too high, side reactions may occur.

The hydrogenation pressure is usually from 0.01 to 20 MPa, preferably from 0.1 to 10 MPa, and more preferably from 1 to 5 MPa. If the hydrogen pressure is too low, the reaction speed is slow. Too high a pressure is undesirable because a high pressure reactor must be used.

After the hydrogenation reaction, the reaction solution is filtered to remove the hydrogenation catalyst and volatile components such as a solvent are removed from the polymer solution after the filtration to obtain the target crystalline norbornene-based ring-opened polymer.

As the method for removing volatile components such as a solvent, a general method such as a coagulation method, a direct drying method, and the like can be given.

In the coagulation method, a polymer solution is mixed with a poor solvent to precipitate the polymer. Examples of the poor solvent used include polar solvents including alcohols such as ethyl alcohol, n-propyl alcohol, and isopropyl alcohol; ketones such as acetone and methyl ethyl ketone; and esters such as ethyl acetate and butyl acetate.

The component in the form of particles obtained by precipitation is dried by heating under vacuum, in nitrogen, or in air to obtain dry particles, or made into pellets by extruding from a melt extruder.

A direct drying method is a method of removing solvents by heating the polymer solution under reduced pressure. This method may be carried out using general equipment such as a continuous vaporization dryer using a centrifugal thin-film, a continuous reactor dryer of a surface scraping heat exchange-type, a high viscosity reactor, or the like. The degree of vacuum and the temperature are not particularly limited and are suitably selected according to the apparatus used.

The hydrogenation rate of the carbon-carbon double bonds in the crystalline norbornene-based ring-opened polymer obtained as mentioned above is usually 80% or more, preferably 90% or more, more preferably 95% or more, still more preferably 99% or more, and particularly preferably 99.9% or more. If the hydrogenation degree is in the above range, coloration of the molded article by resin burning can be suppressed.

The hydrogenation rate of the crystalline norbornene-based ring-opened polymer can be determined by $^1$H-NMR spectrum measurement using deuteriochloroform as a solvent.

The proportion of the repeating unit (A) derived from 2-norbornene in all repeating units of the resulting crystalline norbornene-based ring-opened polymer is usually 90 to 100 wt %, preferably 95 to 99 wt %, and more preferably 97 to 99 wt %, and the proportion of the repeating unit (B) derived from the substituent-containing norbornene monomer in all repeating units is 0 to 10 wt %, preferably 1 to 5 wt %, and more preferably 1 to 3 wt %.

If the amount of the repeating unit (B) is too large, the heat resistance and steam barrier properties of the molded article may be impaired. If the amount of the repeating unit (B) is in the above range, steam barrier properties are excellent. In addition, the molded articles have excellent mechanical properties. If the amount of the repeating unit (B) is too small, the mechanical properties may be poor.

The weight average molecular weight (Mw) of the resulting crystalline norbornene-based ring-opened polymer in terms of the standard polystyrene-reduced value measured by gel permeation chromatography (GPC) using 1,2,4-trichlorobenzene as an eluant is preferably 50,000 to 200,000, more preferably 70,000 to 180,000, and still more preferably 80,000 to 150,000.

If the Mw is in this range, the crystalline norbornene-based ring-opened polymer is easily molded and the resulting molded articles have sufficient mechanical properties and oil resistance. If the Mw is too large, the polymer can be molded only with difficulty. Films and sheets molded using such a polymer tend to produce thickness fluctuation. On the other hand, if the Mw is too small, the molded article may have poor mechanical properties and poor oil resistance.

The molecular weight distribution (Mw/Mn) of the crystalline norbornene-based ring-opened polymer is preferably 1.5 to 7.0, more preferably 2.0 to 6.5, still more preferably 2.5 to 6.0, and particularly preferably 2.5 to 5.5.

If the Mw/Mn is too narrow, the melting viscosity of the polymer delicately changes according to the change of temperature, resulting in impaired processability and thickness fluctuation of the molded article. On the other hand, if the Mw/Mn is too broad, the molded article may have poor mechanical properties. The Mn is a number average molecular weight determined as a standard polystyrene-reduced value by gel permeation chromatography (GPC) using 1,2,4-trichlorobenzene as an eluant.

Since the crystalline ring-opened polymer obtained has a melting point and, therefore, possesses a crystalline structure, the polymer forms crystalline regions in the molded article. The crystalline regions improve the mechanical properties of the molded articles in combination with amorphous regions. In spite of such characteristics, the molded article has good transparency because of the small crystal size.

The melting point of the crystalline norbornene-based ring-opened polymer is usually 110 to 145° C., preferably 120 to 145° C., and more preferably 130 to 145° C.

If the melting point is in the above range, the molded article has good heat resistance. The melting point in a range of 130 to 145° C. is preferable due to capability of the polymer to withstand steam sterilization when producing molded articles for medical container.

The melting point of the crystalline norbornene-based ring-opened polymer can be controlled by the molecular weight, molecular weight distribution, isomerization degree, composition ratio, and the like.

The isomerization rate of the crystalline ring-opened polymer is usually 40% or less, preferably 20% or less, more preferably 10% or less, and still more preferably 5% or less. If the isomerization rate is too high, the polymer may have reduced heat resistance. The isomerization rate can be calculated using an equation, 33.0 ppm peak integration value/(31.8 ppm peak integration value+33.0 ppm peak integration value)×100, wherein the peak integration values are determined by $^{13}$C-NMR spectrum measurement using deuteriochloroform as a solvent. The 31.8 ppm peak is a peak derived from cis-isomers of 2-norbornene repeating units in the polymer and the 33.0 ppm peak is a peak derived from trans-isomers of 2-norbornene repeating units in the polymer.

In order to produce a norbornene-based ring-opened polymer having the isomerization rate of the above range, the hydrogenation reaction temperature of the ring-opened polymer of norbornene monomers is preferably 100 to 200° C., more preferably 120 to 170° C., and particularly preferably 130 to 160° C., and the amount of the hydrogenation catalyst should preferably be 0.2 to 5 parts by weight, and more preferably 0.2 to 1 part by weight for 100 parts by weight of the ring-opened polymer of norbornene monomers. The above range of the isomerization rate is preferable because of excellently-balanced hydrogenation reaction rate and heat resistance of the polymer.

(2) Amorphous Alicyclic Structure-Containing Polymer (2)

The amorphous alicyclic structure-containing polymer (2) of the present invention is obtained by polymerization of the polymerizable monomer mixture (2) containing a 2-norbornene (bicyclo[2.2.1]hept-2-ene) compound and a dicyclopentadiene (tricyclo[4.3.0.1$^{2,5}$]deca-3,7-diene) compound in an amount of 50 wt % or more and less than 90 wt % in total, has a glass transition temperature of 50° C. or more, and does not have a melting point. As the amorphous alicyclic structure-containing polymer (2), a ring-opened polymer obtained by ring-opening polymerization of the polymerizable monomer mixture (2), a hydrogenation product of the ring-opened polymer obtained by hydrogenating this ring-opened polymer, an addition copolymer obtained by the addition copolymerization of the polymerizable monomer mixture (2) and an α-olefin, and the like can be given. Among these, the hydrogenation product of the ring-opened polymer obtained by hydrogenating the ring-opened polymer which is obtained by ring-opening polymerization of the polymerizable monomer mixture (2) is preferable.

The proportion of the 2-norbornene compound in the polymerizable monomer mixture (2) is preferably 50 wt % or less, and more preferably 40 wt % or less and the proportion of the dicyclopentadiene compound is preferably 30 wt % or more, more preferably 40 wt % or more, and particularly preferably 50 wt % or more. It is possible to suppress steam permeability while ensuring excellent transparency by utilizing the polymerizable monomer mixture (2) having such a monomer proportion. In particular, if the proportion of the dicyclopentadiene compound is too small, the transparency tends to be decreased.

The 2-norbornene compound refers to 2-norbornene or a substituted 2-norbornene. The substituted 2-norbornene is a norbornene monomer having no ring which condenses with a norbornene ring in the molecule among the above-mentioned substituent-containing norbornene monomers.

The dicyclopentadiene compound refers to dicyclopentadiene or a substituted dicyclopentadiene. As examples of the substituted dicyclopentadiene, methyl dicyclopentadiene, dimethyl dicyclopentadiene, and the like can be given.

In addition to the 2-norbornene compound and the dicyclopentadiene compound, monomers copolymerizable with these monomers can be given as the monomers used as the polymerizable monomer mixture (2). As such copolymerizable monomers, the above-mentioned polycyclic norbornene monomers having three or more rings and the other above-mentioned monomers copolymerizable with the 2-norbornene and substituent-containing norbornene monomers can be given. Of these, the polycyclic norbornene monomers having three or more rings, particularly tetracyclododecenes are preferable.

The proportion of the other monomers polymerizable by the ring-opening copolymerization is preferably 10 wt % or more, more preferably 15 wt % or more, and particularly preferably 20 wt % or more.

The amorphous alicyclic structure-containing polymer (2) can be produced by polymerizing a 2-norbornene compound, a dicyclopentadiene compound, and the other optionally used monomers using a commonly known polymerization catalyst.

As the method for producing a ring-opened polymer and a hydrogenated ring-opened polymer, methods described in JP-A-4-77520, WO 00/73366, and the like can be given. As the method for producing the addition polymer, methods described in JP-A-60-168708, JP-A-3-45612, JP-T-11-508635, JP-A-2004-107442, JP-A-2004-107486, and the like can be given.

The glass transition temperature (Tg) of the amorphous alicyclic structure-containing polymer (2) is usually 50° C. or more, preferably 55° C. or more, and more preferably 60° C. or more. If the Tg is low, the steam permeability tends to be high.

(Additives)

Additives may be added as required to the polymer composition of the present invention. Examples of the additives include antioxidants, rubber-like polymers, UV absorbers, weather-resistant stabilizers, antistatic agents, nucleating agents, slipping agents, anticlouding agents, dyes, pigments, coloring agents, natural oils, synthetic oils, plasticizers, organic or inorganic fillers, antibacterial agents, deodorants, and the like.

An antioxidant having a molecular weight of 700 or more is preferably used. If the molecular weight of the antioxidant is too small, the molded article may allow the antioxidant to elute therefrom.

As specific examples of the antioxidant, phenolic antioxidants such as octadecyl-3-(3,5-di-t-butyl-4-hydroxyphenyl) propionate, tetrakis[methylene-3-(3',5'-di-t-butyl-4'-hydroxyphenyl)propionate]methane, and pentaerythrityl-tetrakis[3-(3,5-di-tert-butyl-4-hydroxyphenyl)propionate]; phosphorus antioxidants such as triphenylphosphite, tris(cyclohexylphenyl)phosphite, and 9,10-dihydro-9-oxa-10-phosphaphenanthrene; sulfur-containing antioxidants such as dimyristyl-3,3'-thiodipropionate, distearyl-3,3'-thiodipropionate, laurylstearyl-3,3'-thiodipropionate, and pentaerythritol-tetrakis($\beta$-laurylthiopropionate); and the like can be given. These antioxidants may be used either individually or in combination of two or more. Among these, phenolic antioxidants are preferable.

The amount of the antioxidant to be added is usually 0.01 to 1 part by weight, and preferably 0.05 to 0.5 parts by weight for 100 parts by weight of the total amount of the crystalline norbornene-based ring-opened polymer and the amorphous alicyclic structure-containing polymer. If the amount of antioxidant is too small, the molded article may be easily burnt (colored). On the other hand, if the amount is too large, the molded article may be whitened or allow the antioxidant to elute therefrom.

The rubber-like polymers are polymers having a glass transition temperature of 40° C. or less and include rubbers and thermoplastic elastomers. When the polymer has two or more glass transition temperatures as in the case of a block copolymer, such a polymer may be used as the rubber-like polymer if the lowest glass transition temperature is 40° C. or less. Although the viscosity of the rubber-like polymer may be suitably selected according to the purpose of use, the Mooney viscosity ($ML_{1+4}$, 100° C.) is usually 5 to 300.

As examples of the rubber-like polymer, ethylene-$\alpha$-olefin rubbers, ethylene-$\alpha$-olefin-polyene copolymer rubbers, copolymers of ethylene and an unsaturated carboxylate, copolymers of ethylene and vinyl fatty acid, polymers of alkyl acrylate; diene rubbers, butylenes-isoprene copolymers, aromatic vinyl-conjugated diene block copolymers, low crystalline polybutadiene resins, ethylene-propylene elastomers, styrene-grafted ethylene-propylene elastomers, thermoplastic polyester elastomers, ethylene-based ionomer resins, and the like can be given.

The amount of the rubber-like polymers is suitably selected according to the purpose of use. When impact resistance and flexibility are demanded, the amount of the rubber-like polymers is usually in a range from 0.01 to 100 parts by weight, preferably from 0.1 to 70 parts by weight, and more preferably from 1 to 50 parts by weight for 100 parts by weight of the total of the crystalline norbornene-based ring-opened polymer and the amorphous alicyclic structure-containing polymer.

As examples of the UV absorbers and the weather resistant stabilizers, hindered amine compounds, benzotriazole compounds, benzoate compounds, and the like can be given.

These UV absorbers and the weather-resistant stabilizers may be used either individually or in combination of two or more. The amount of the UV absorbers and the weather resistant stabilizers is usually from 0.001 to 5 parts by weight, and preferably 0.01 to 2 parts by weight for 100 parts by weight of the total of the crystalline norbornene-based ring-opened polymer and the amorphous alicyclic structure-containing polymer.

As examples of the antistatic agent, long-chain alkyl alcohols such as stearyl alcohol and behenyl alcohol; sodium alkylsulfonate and/or phosphonium salt of alkylsulfonic acid; fatty acid esters such as glycerol ester of stearic acid; hydroxyamine compounds; amorphous carbon, tin oxide powder, antimony-containing tin oxide powder; and the like can be given. The antistatic agent is usually used in an amount of 0.001 to 5 parts by weight for 100 parts by weight of the total of the crystalline norbornene-based ring-opened polymer and the amorphous alicyclic structure-containing polymer.

As examples of the nucleating agents, dibenzylidene sorbitol derivatives, metal phosphates, metal benzoates, metal carboxylates, metal rosinates, high-density polyethylene, 3-position branched olefins having 5 or more carbon atoms such as 3,3-dimethylbutene, polymers of vinyl cycloalkane, inorganic compounds such as metal sebacates, silica, titanium oxide, carbon black, talc, alum, and calcium carbonate, butyl benzoates, and pigments can be given. These nucleating agents may be used individually or in combination of two or more. The amount of the nucleating agent is usually 0.005 to 10 parts by weight, and preferably 0.05 to 5 parts by weight for 100 parts by weight of the total amount of the crystalline norbornene-based ring-opened polymer and the amorphous alicyclic structure-containing polymer.

(Preparation of Polymer Composition)

Although there are no particular limitations to the method for producing the polymer composition of the present invention, a method of kneading the components in a molten state to obtain a pellet-like composition is preferable. More specifically, a method of melting and kneading the crystalline norbornene-based polymer (1), the amorphous alicyclic structure-containing polymer (2), and optionally used additives; a method of obtaining pellets of a composition of the crystalline norbornene-based polymer (1) by melting and kneading the crystalline norbornene-based polymer (1) and optionally used additives, separately obtaining pellets of a composition of the amorphous alicyclic structure-containing polymer (2) by melting and kneading the amorphous alicyclic structure-containing polymer (2) and optionally used additives, and melting and kneading these pellets; a method of obtaining pellets of a first composition of either the crystalline norbornene-based polymer (1) or the amorphous alicyclic structure-containing polymer (2) by melting and kneading the crystalline norbornene-based polymer (1) or the amorphous alicyclic structure-containing polymer (2) and optionally used additives, separately obtaining pellets of either the crystalline norbornene-based polymer (1) or the amorphous alicyclic structure-containing polymer (2) which was not used in the first composition by melting and kneading the polymer without adding the additives, and melting and kneading these pellets; and the like can be given. As examples of the melt kneader, commonly-known kneaders such as an open-type mixing roller, a closed-type banbury mixer, an extruder, a kneader, a continuous kneader, and the like can be given.

(Molding of Polymer Composition)

The polymer composition of the present invention may be molded into films, sheets, and various other molded articles using a commonly-known method. For example, extrusion molding, injection molding, compression molding, blow molding, rotational molding, and the like can be applied to the composition using a mono-axial extruder, a vent-type extruder, a two-screw extruder, a two-screw cone extruder, a cokneader, a platificator, a mixtruder, a biaxial conical screw extruder, a planet screw extruder, a gear-type extruder, a screwless extruder, and the like. In addition, a film and a sheet may be obtained by T-die molding, inflation molding, and the like. The polymer may be directly molded when producing the composition.

2) Film

A film of the present invention is obtained by molding the polymer composition of the present invention.

The film of the present invention contains the polymer composition of the present invention in an amount of usually 50 wt % or more, preferably 70 wt % or more, and more preferably 90 wt % or more.

The method of molding the film of the present invention is not particularly limited. Generally known molding methods such as an extrusion molding method, an inflation molding method, a calender molding method, a compression molding method, a cast molding method, and the like may be used.

There are no specific limitations to the thickness of the film of the present invention. The thickness is usually 1 nm to 20 mm, preferably 5 nm to 5 mm, and more preferably 10 nm to 2 mm.

The film of the present invention may be a laminate having a layer containing the polymer composition of the present invention and a layer containing other general polymers commonly used in the field of household appliance, foods, medical containers, and the like.

The number of the layers to be laminated is usually two or three, but the film or the sheet may be a multilayer laminate consisting of more than three layers. The order of the types of polymers in layers of the three or more multilayer laminate may be appropriately determined according to the purpose and application.

The film of the present invention has a low steam permeability (excellent steam barrier properties). The steam barrier properties of the film of the present invention can be evaluated by measuring the steam permeability according to JIS K7129 (method A), for example, using a steam permeability tester (L80-5000 type, manufactured by LYSSY) under the conditions of a temperature of 50° C. and humidity of 90% RH.

The steam permeability of the film of the present invention with a thickness of 250 μm is usually 0.5 $g/(m^2 \cdot 24\ h)$ or less, preferably 0.45 $g/(m^2 \cdot 24\ h)$ or less, more preferably 0.40 $g/(m^2 \cdot 24\ h)$ or less, and still more preferably 0.35 $g/(m^2 \cdot 24\ h)$ or less.

The film of the present invention has excellent mechanical properties. The excellent mechanical properties of the film of the present invention can be evaluated by measuring the tensile breaking elongation of a test specimen having a 1B shape and a thickness of 250 μm at a tensile velocity of 200 mm/min according to JIS K7162 using an Autograph (AGS-5kNH, manufactured by Shimadzu Corp.).

The tensile breaking elongation of the film of the present invention is usually 50% or more, preferably 60% or more, and more preferably 70% or more.

The film of the present invention can be used for a wide variety of applications in the fields of food industries, medical supplies, displays, energy, optical appliances, electric and electronic parts, telecommunications sector, vehicles, public welfare, civil engineering and construction, and the like. The fields in which the resin film of the present invention is particularly useful include the fields of food industries, medical supplies, energy, displays, and the like.

Applications in the fields of food industries include food packaging, such as a wrap film, a shrink film, and a film for blister packages of processed foods such as ham, sausage, pouch-packed food, and frozen food, dried food, specified health food, rice, confectionery, meat, and the like.

In the medical field, the film of the present invention may be used as a medical bottle plug, an infusion bag, an intravenous drip bag, a film for a press through package (PTP), a film for blister packages, and the like.

In the energy fields, the resin film of the present invention may be used as an auxiliary component material of a solar energy power generation system, a fuel-cell peripheral component, an alcohol-containing fuel system component, and a packing film of these components.

In the display field, the resin film of the present invention may be used as a barrier film, a phase difference film, a polarization film, an optical diffusion sheet, a condensing sheet, and the like.

3) Medical Container

The medical container of the present invention is obtained by molding the polymer composition of the present invention.

The medical container of the present invention can be obtained by molding the polymer composition of the present invention in a desired form according to the application.

The term "medical container" in the present invention refers to various containers for medical supplies. Examples include sample containers such as injection liquid containers, ampoules, prefilled syringe, bags for transfusion, solid medicine containers, eye-drop containers, intravenous drip medicine containers, solid medicine containers, a blood collecting pipe, a specimen containers, and the like; a preservation container or a sterile container for catheters, scalpels, gauze, and contact lenses; medical devices such as medical application transfusion inner tubes, an injector, and the like. The medical container of the present invention has favorable features of adsorbing only a small amount of a medicine and exhibiting a minimal loss of the packed medicine as compared with medical containers made from general resins particularly when used for a medicine bottle, a prefilled syringe, a sealed drug bag, a press through package, a container for applying eye-drops, an ampoule, a vial, an intravenous drip medicinal container, and the like in which drugs are preserved for a long period of time.

Examples of the medicine with which the medical container of the present invention may be filled include compounds having a polar group such as alcohols, amines, esters, amides, ethers, carboxylic acids, and amino acids. Specific examples include antihistamines such as chlorpheniramine maleate, diphenhydramine, iroheptine, ketotifen fumarate, emedastine fumarate, clemastine fumarate, azelastine, levocabastine, olopatadine, diphenhydramine hydrochloride, iroheptine hydrochloride, azelastine hydrochloride, levocabastine hydrochloride, and olopatadine hydrochloride, anti-inflammation agents such as methyl salicylate, local irritation agents such as menthol and camphor, antibacterial agents, and vitamins.

These medicines may be optionally prepared and used as an aqueous solution.

EXAMPLES

The present invention will be described below more specifically by way of examples and comparative examples, which are not intended to limit the present invention. In the examples and comparative examples, "part(s)" means "part(s) by weight" and "%" means "wt %" unless otherwise indicated. In the following examples and comparative examples, properties were measured by the following methods.

(1) The weight average molecular weight (Mw) and the number average molecular weight (Mn) of the polymers before hydrogenation were measured as standard polystyrene-reduced values by gel permeation chromatography (GPC) using toluene as an eluant.

As the measuring device, GPC-8020 series instruments (DP8020, SD8022, AS8020, CO8020, and RI8020 manufactured by Tosoh Corp.) were used.

As the standard polystyrene, eight standard polystyrenes having an Mw, 500, 2630, 10,200, 37,900, 96,400, 427,000, 1,090,000, and 5,480,000 (manufactured by, Tosoh Corp.) were used.

The sample was prepared by dissolving the polymer to be analyzed in toluene to a concentration of 1 mg/ml and filtering through a cartridge filter (made of porous polytetrafluoroethylene, pore size: 0.5 μm).

The molecular weight was measured by feeding a sample to two TSKgel GMHHR-H columns (manufactured by Tosoh Corp.) connected in series at a flow rate of 1.0 ml/min in an amount of 100 μml at a column temperature of 40° C.

(2) The weight average molecular weight (Mw) and the number average molecular weight (Mn) of the polymers after hydrogenation were measured at 140° C. as standard polystyrene-reduced values by gel permeation chromatography (GPC) using 1,2,4-trichlorobenzene as an eluant.

HLC8121GPC/HT (manufactured by Tosoh Corp.) was used as a measuring device.

As the standard polystyrene, 16 standard polystyrenes having an Mw, 988, 2580, 5910, 9010, 18,000, 37,700, 95,900, 186,000, 351,000, 889,000, 1,050,000, 2,770,000, 5,110,000, 7,790,000, and 20,000,000 (manufactured by, Tosoh Corp.) were used.

The sample was prepared by dissolving the polymer to be analyzed in 1,2,4-trichlorobenzene with heating at 140° C. to a concentration of 1 mg/ml.

The molecular weight was measured by feeding a sample to three TSKgel GMHHR-H (20) HT columns (manufactured by Tosoh Corp.) connected in series at a flow rate of 1.0 ml/min in an amount of 300 μml at a column temperature of 140° C.

(3) The hydrogenation rate was measured by $^1$H-NMR using deuteriochloroform as a solvent.

(4) The isomerization rate of the crystalline norbornene-based ring-opened polymer was calculated by applying the peak values of 31.8 ppm and 33.0 ppm determined by $^{13}$C-NMR using deuteriochloroform as a solvent to "[(33.0 ppm peak integration value)/(31.8 ppm peak integration value+ 33.0 ppm peak integration value)]×100".

The 31.8 ppm peak is a peak derived from cis-isomers of 2-norbornene repeating units in the hydrogenated ring-opened polymer and the 33.0 ppm peak is a peak derived from trans-isomers of 2-norbornene repeating units in the hydrogenated ring-opened polymer.

(5) The melting point (Tm) was measured according to JIS K7121 using a differential scanning calorimeter (DSC6220SII manufactured by Nano Technology Inc.) in the course of heating the sample from room temperature at a rate of 10° C./min, after first heating to a temperature 30° C. higher than the melting point and then cooling to room temperature at a cooling rate of −10° C./min.

(6) The glass transition temperature (Tg) was measured according to JIS K6911 using a differential scanning calorimeter (DSC6220SII manufactured by Nano Technology Inc.).

(7) The melt mass flow rate was measured according to JIS K7210 at 190° C. and a load of 2.16 kg.

(8) The steam barrier property evaluation test was conducted according to JIS K7129 (method A) using a steam permeability tester (L80-5000 type, manufactured by LYSSY) under conditions of a temperature of 40° C. and a humidity of 90% RH. A small steam permeability (g/(m$^2$·24 h)) indicates good steam barrier properties.

(9) The haze value was measured by preparing a film sample with a thickness of 100 μm and using a haze meter (NDH2000 manufactured by Nippon Denshoku Co., Ltd.). A smaller haze value (%) indicates better transparency.

(10) The elusion test was conducted according to "Plastic medical container assay" of the Japanese Pharmacopoeia (15$^{th}$ revision), in which foaming disappearance, potassium permanganate consumption, and pH were compared.

Specifically, a sample was regarded to be acceptable when all of the following conditions were satisfied.

(i) Foam was disappeared in less than three minutes in the foam disappearance test.
(ii) The potassium permanganate consumption was less than 0.5 ppm in the potassium permanganate consumption test.
(iii) pH difference was less than 1.5 in the pH difference test.

In preparing test samples, the films obtained in Examples and Comparative Examples by blow molding were cut into strips (about 400 g) with a length of 5 cm and a width of 0.3 cm.

(11) The shape of the bottle and the distilled water preservation rate after steam sterilization were evaluated as follows.

After ultrasonic washing in distilled water for 20 minutes, a bottle was sterilized with steam at 121° C. for 30 minutes and sufficiently dried to confirm the shape. Then, the bottle was charged with 10 ml of distilled water and sealed with a polytetrafluoroethylene plug, and its weight was measured. After allowing the bottle to stand in a dark place at room temperature of 23° C. for 60 days, the weight of the bottle with distilled water therein was measured to determine the preservation rate from the weight change.

(12) In the adsorption test, the prepared bottle was ultrasonically washed in distilled water for 20 minutes and sufficiently dried. After measuring the weight, the bottle was charged with 2 g of 1-menthol and sealed with a polytetrafluoroethylene plug. After allowing the bottle to stand in a dark place at room temperature of 23° C. for 30 days, 1-menthol was removed and the weight of the bottle was again measured to determine the adsorption rate from the weight change.

Preparation Example 1

Ring-Opening Polymerization

A reactor was charged with 500 parts of dehydrated cyclohexane, 0.55 parts of 1-hexene, 0.30 parts of diisopropyl ether, 0.20 parts of triisobutylaluminum, and 0.075 parts of isobutyl alcohol at room temperature under a nitrogen atmosphere. While maintaining the temperature at 55° C., 250 parts of bicyclo[2.2.1]hept-2-ene (hereinafter referred to as "2-NB") as a polymerizable monomer and 15 parts of a 1.0% solution of tungsten hexachloride in toluene as a polymerization catalyst were continuously added in two hours to polymerize the monomers. The weight average molecular weight of the resulting ring-opened polymer (A) was 83,000, and the molecular weight distribution (Mw/Mn) was 1.8.
(Hydrogenation Reaction)

The polymerization reaction solution containing the ring-opened polymer (A) obtained above was transferred to a pressure resistant hydrogenation reactor. After the addition of 0.5 parts of a nickel catalyst supported on diatomaceous earth (T8400, nickel support rate: 58%, manufactured by SüChemie), the hydrogenation reaction was carried out at 160° C. under a hydrogen pressure of 4.5 MPa for six hours. The solution was filtered through a stainless steel wire mesh filter, in which diatomaceous earth was used as a filter aid to remove the catalyst.

The reaction solution was poured into 3,000 parts of isopropyl alcohol while stirring to precipitate the hydrogenated product, which was collected by filtration. After washing with 500 parts of acetone, the hydrogenated product was dried in a vacuum dryer at 100° C. under $0.13 \times 10^3$ Pa or less for 48 hours to obtain 190 parts of a hydrogenated ring-opened polymer (A).
(Properties of Polymer)

The hydrogenation rate of the resulting hydrogenated ring-opened polymer (A) was 99.9%, the weight average molecular weight was 82,200, the molecular weight distribution (Mw/Mn) was 2.9, the isomerization rate was 5%, and the melting point was 140° C.
(Preparation of Resin Composition)

0.1 part of an antioxidant (tetrakis[methylene-3-(3',5'-di-tert-butyl-4'-hydroxyphenyl)propionate]methane (Irganox 1010 manufactured by Ciba Specialty Chemicals)) was added to 100 parts of the hydrogenated ring-opened polymer (A), and the mixture was kneaded using a twin-screw kneader (TEM-35B manufactured by Toshiba Machine Co., Ltd.) to obtain a pelletized resin composition (A).

Preparation Example 2

Ring-Opening Copolymerization and Hydrogenation Reaction

A polymerization reaction was carried out in the same manner as in the Preparation Example 1 except that the amount of the monomers used was 240 parts of 2-NB and 10 parts of tricyclo[4.3.0.1$^{2,5}$]dec-3-ene (hereinafter referred to as "DCP"), and the amount of other components was 0.55 parts of 1-hexene, 0.40 parts of diisopropyl ether, 0.27 parts of triisobutylaluminum, 0.10 part of isobutyl alcohol, and 20 parts of a 1.0% tungsten hexachloride solution in toluene. The weight average molecular weight of the resulting ring-opened polymer (B) was 83,000, and the molecular weight distribution (Mw/Mn) was 2.7. The polymerization conversion rate was about 100%. The hydrogenation reaction was carried out in the same manner as in the Preparation Example 1 to obtain 190 parts of a hydrogenated ring-opened copolymer (B).
(Properties of Polymer)

The hydrogenation rate of the resulting hydrogenated ring-opened copolymer (B) was 99.9%, the weight average molecular weight was 81,300, the molecular weight distribution (Mw/Mn) was 3.8, the isomerization rate was 9%, and the melting point was 134° C.
(Preparation of Resin Composition)

A pelletized resin composition (B) was prepared in the same manner as in the Preparation Example 1, except for using the hydrogenated ring-opened copolymer (B).

Preparation Example 3

Ring-Opening Copolymerization

An autoclave equipped with a stirrer was charged with 33.4 parts of a 70% toluene solution of 2-NB, 2.86 parts of DCP, 0.020 parts of 1-hexene, and 49.3 parts of cyclohexane, and the mixture was stirred. Then, a solution containing 0.023 parts of bis(tricyclohexylphosphine)benzylidyneruthenium (IV) dichloride dissolved in 8.6 parts of toluene was added, and the reaction was carried out at 60° C. for 30 minutes. The polymerization conversion rate was about 100%. The weight average molecular weight of the resulting ring-opened polymer (C) was 81,000, and the molecular weight distribution (Mw/Mn) was 3.6.
(Hydrogenation Reaction)

0.020 parts of ethyl vinyl ether was added to the polymer solution obtained above and the mixture was stirred, followed by a hydrogenation reaction under hydrogen pressure of 1.0 MPa at 150° C. for 20 hours. After cooling to room temperature, a suspension of 0.5 parts of activated carbon in 10 parts of cyclohexane was added and the mixture was reacted under hydrogen pressure of 1.0 MPa at 150° C. for two hours. The reaction mixture was filtered through a filter with a pore diameter of 0.2 µm to remove the activated carbon. The reaction solution was poured into a large amount of isopropanol to cause the polymer to completely precipitate. The precipitate was collected by filtration. After washing with acetone, the precipitate was dried in a vacuum dryer at 100° C. under $0.13 \times 10^3$ Pa or less for 48 hours to obtain a hydrogenated ring-opened copolymer (C).
(Properties of Polymer)

The hydrogenation rate of the resulting hydrogenated ring-opened copolymer (C) was 99.9%, the weight average molecular weight was 85,000, the molecular weight distribution (Mw/Mn) was 3.9, and the melting point was 101° C.
(Preparation of Resin Composition)

A pelletized resin composition (C) was prepared in the same manner as in the Preparation Example 1, except for using the hydrogenated ring-opened copolymer (C).

Preparation Example 4

Ring-Opening Copolymerization and Hydrogenation Reaction

A reactor of which the internal atmosphere had been replaced with nitrogen was charged with 7 parts of a mixture of 2-NB, DCP and tetracyclo[$4.4.0.1^{2,5}.1^{7,10}$]dodec-3-ene (hereinafter referred to as "TCD") (weight ratio: 7/53/40), which corresponds to 1 wt % of the total amount of monomers used, and 1,600 parts of cyclohexane. 0.55 parts of tri-1-butyl aluminum, 0.21 parts of isobutyl alcohol, 0.84 parts of diisopropyl ether as a reaction adjuster, and 3.94 parts of 1-hexene as a molecular weight controlling agent were added to the mixture. After the addition of 24.1 parts of a 0.65% tungsten hexachloride solution dissolved in cyclohexane, the mixture was stirred at 55° C. for 10 minutes. Then, while maintaining the temperature at 55° C., 693 parts of a mixture of norbornene, dicyclopentadiene, and tetracyclododecene (weight ratio: Jul. 53, 1940) and 48.9 parts of a 0.65% tungsten hexachloride solution in cyclohexane were continuously added to the reaction system over 150 minutes. The mixture was then reacted for 30 minutes before terminating the polymerization. The polymerization conversion rate was about 100%. The weight average molecular weight of the resulting ring-open polymer (D) was 20,000 and the molecular weight distribution (Mw/Mn) was 1.9. The hydrogenation reaction was carried out in the same manner as in the Preparation Example 1 to obtain a hydrogenated ring-opened copolymer (D).
(Properties of Polymer)

The hydrogenation rate of the resulting hydrogenated ring-opened copolymer (D) was 99.9%, the weight average molecular weight was 21,100, the molecular weight distribution (Mw/Mn) was 1.8, the isomerization rate was 0%, the glass transition temperature was 111° C., and the melting point was not observed.
(Preparation of Resin Composition)

A pelletized resin composition (D) was prepared in the same manner as in the Preparation Example 1, except for using the hydrogenated ring-opened copolymer (D).

Preparation Example 5

Ring-Opening Copolymerization and Hydrogenation Reaction

A polymerization reaction was carried out in the same manner as in the Preparation Example 1 except that 35.7 parts of 70% 2-NB/toluene solution, 0.048 parts of 1-hexene, and 49.3 parts of cyclohexane were respectively changed to 25.0 parts of 9-ethyltetracyclo[$6.2.1.1^{3,6}.0^{2,7}$]dodec-4-ene (hereinafter referred to as "ETD"), 0.17 parts of 1-hexene, and 65.0 parts of cyclohexane. The weight average molecular weight of the resulting ring-opened polymer (E) was 14,600 and the molecular weight distribution (Mw/Mn) was 2.1. The polymerization conversion rate was about 100%. The hydrogenation reaction was carried out in the same manner as in the Preparation Example 1 to obtain a hydrogenated ring-opened copolymer (E).
(Properties of Polymer)

The hydrogenation rate of the resulting hydrogenated ring-opened copolymer (E) was 99.9%, the weight average molecular weight was 23,100, the molecular weight distribution (Mw/Mn) was 1.9, the isomerization rate was 0%, the glass transition temperature was 134° C., and the melting point was not observed.
(Preparation of Resin Composition)

A pelletized resin composition (E) was prepared in the same manner as in the Preparation Example 1, except for using the hydrogenated ring-opened copolymer (E).

Preparation Example 6

Ring-Opening Copolymerization and Hydrogenation Reaction)

A reactor was charged with 500 parts of dehydrated cyclohexane, 0.82 parts of 1-hexene, 0.15 parts of dibutyl ether, and 0.30 parts of triisobutylaluminum at room temperature under a nitrogen atmosphere. While maintaining the temperature at 45° C., a norbornene monomer mixture consisting of 80 parts of DCP, 50 parts of tetracyclo[$9.2.1.0^{2,10}.0^{3,8}$]tetra-deca-3,5, 7,12-tetraene (hereinafter referred to as "MTF"), and 70 parts of TCD and 40 parts of a 0.7% solution of tungsten hexachloride in toluene were continuously added in two hours to polymerize the monomers. 1.06 parts of butyl glycidyl ether and 0.52 parts of isopropyl alcohol were added to the reaction solution to deactivate the polymerization catalyst, thereby terminating the polymerization reaction. The weight average molecular weight of the resulting ring-opened polymer (F) was 32,000 and the molecular weight distribution (Mw/Mn) was 2.1. The polymerization conversion rate was about 100%. 270 parts of cyclohexane was added per 100 parts of the resulting reaction solution containing the ring-opened polymer. After further addition of 5 parts of a nickel-alumina catalyst (manufactured by JGC Chemical Co., Ltd.) as a hydrogenation catalyst, the mixture was heated to 200° C. while stirring under a hydrogen pressure of 5 MPa and reacted for four hours to obtain a reaction solution containing 20% of a hydrogenated DCP/MTF/TCD ring-opened polymer. The hydrogenation catalyst was removed from the reaction solution by filtration.
(Properties of Polymer)

The hydrogenation rate of the resulting hydrogenated ring-open copolymer (F) was 99.9%, the weight average molecular weight was 35,000, the molecular weight distribution (Mw/Mn) was 2.5, the isomerization rate was 0%, the glass transition temperature was 134° C., and the melting point was not observed.
(Preparation of Resin Composition)

A pelletized resin composition (F) was prepared in the same manner as in the Preparation Example 1, except for using the hydrogenated ring-opened copolymer (F).

Preparation Example 7

Ring-Opening Copolymerization and Hydrogenation Reaction

Polymerization was carried out in the same manner as in the Preparation Example 1, except that 100 parts of 2-NB and 150 parts of DCP were used instead of 250 parts of 2-NB, and the amount of 1-hexene used was 0.60 parts. The weight average molecular weight of the resulting ring-opened polymer (G) was 40,000 and the molecular weight distribution (Mw/Mn) was 3.4. The hydrogenation reaction was carried out in the same manner as in the Preparation Example 1, except that the amount of the nickel catalyst supported on diatomaceous earth was 3 parts, to obtain a hydrogenated ring-opened polymer (G).

(Properties of Polymer)

The hydrogenation rate of the resulting hydrogenated ring-opened copolymer (G) was 99.9%, the weight average molecular weight was 45,000, the molecular weight distribution (Mw/Mn) was 4.1, the isomerization rate was 0%, the glass transition temperature was 40° C., and the melting point was not observed.

(Preparation of Resin Composition)

A pelletized resin composition (G) was prepared in the same manner as in Preparation Example 1, except for using the hydrogenated ring-opened copolymer (G).

The properties of the crystalline norbornene-based ring-opened polymer are summarized in Table 1.

TABLE 1

| Preparation Example | Polymerizable monomer (weight ratio) | Resin composition | Ring-opened polymer | | Hydrogenated ring-opened polymer | | Melting point or Tg (° C.) |
|---|---|---|---|---|---|---|---|
| | | | Mw | Mw/Mn | Mw | Mw/Mn | |
| 1 | 2-NB (100) | A | 83,000 | 1.8 | 82,200 | 2.9 | 140 (melting point) |
| 2 | 2-NB/DCP (96/4) | B | 83,000 | 2.7 | 81,300 | 3.8 | 134 (melting point) |
| 3 | 2-NB/DCP (89/11) | C | 81,000 | 3.6 | 85,000 | 3.9 | 101 (melting point) |
| 4 | 2-NB/DCP/TCD (7/53/40) | D | 20,000 | 1.9 | 21,100 | 1.8 | 111 (Tg) |
| 5 | ETD (100) | E | 14,600 | 2.1 | 23,100 | 1.9 | 134 (Tg) |
| 6 | DCP/MTF/TCD (40/25/35) | F | 32,000 | 2.1 | 35,000 | 2.5 | 134 (Tg) |
| 7 | 2-NB/DCP (40/60) | G | 40,000 | 3.4 | 45,000 | 4.1 | 40 (Tg) |

Example 1

90 parts of the pellets of the resin composition (A) obtained in the Preparation Example 1 and 10 parts of the pellets of the resin composition (D) obtained in the Preparation Example 4 were mixed in a blender. The pellet mixture was kneaded under the following kneading conditions using a twin-screw kneader (TEM-35B manufactured by Toshiba Machine Co., Ltd.) and extruded to obtain pellets of the resin composition (1).

Screw diameter: 37 mm, L/D=32
Screw rotation: 250 rpm
Resin temperature: 200° C.
Feed rate: 15 kg/hour The pellets of the resin composition (1) obtained were molded into a monolayer film (1) (thickness: 100 nm) by T-die molding using a hanger manifold T-die film melt extruding press machine having a resin melting kneader equipped with a screw having a screw diameter of 50 mm, a compression ratio of 2.5, and L/D=30 under the following conditions.

Die lip: 0.8 mm
Molten resin temperature: 210° C.
Width of T-die: 300 mm
Cooling roll: 40° C.
Cast roll: 40° C.

The steam barrier properties, haze value, and viscoelasticity of the resulting monolayer film (1) were evaluated. The results are shown in Table 2.

Example 2

70 parts of the pellets of the resin composition (A) obtained in the Preparation Example 1 and 30 parts of the pellets of the resin composition (D) obtained in the Preparation Example 4 were mixed in a blender. The pellet mixture was kneaded in the same manner as in Example 1 except for increasing the resin temperature to 210° C. using a twin-screw kneader (TEM-35B manufactured by Toshiba Machine Co., Ltd.) and extruded to obtain pellets of the resin composition (2).

The pellets of the resin composition (2) obtained were molded into a monolayer film (2) (thickness: 100 nm) by T-die molding using a hanger manifold T-die film melt extruding press machine having a resin melting kneader equipped with a screw having a screw diameter of 50 mm, a compression ratio of 2.5, and L/D=30 under the following conditions.

Die lip: 0.8 mm
Molten resin temperature: 220° C.
Width of T-die: 300 mm
Cooling roll: 50° C.
Cast roll: 50° C.

The steam barrier properties, haze value, and viscoelasticity of the resulting monolayer film (2) were evaluated. The results are shown in Table 2.

Example 3

Pellets of resin composition (3) and a monolayer film (3) (thickness: 100 nm) were obtained in the same manner as in Example 2, except that the amounts of the resin composition (A) and the resin composition (D) were changed respectively to 60 parts and 40 parts.

The steam barrier properties, haze value, and viscoelasticity of the resulting monolayer film (3) were evaluated. The results are shown in Table 2.

Example 4

Pellets of resin composition (4) and a monolayer film (4) (thickness: 100 μm) were obtained in the same manner as in Example 2, except for using 70 parts of the resin composition (B) and changing the amount of the resin composition (D) to 30 parts.

The steam barrier properties, haze value, and viscoelasticity of the resulting monolayer film (4) were evaluated. The results are shown in Table 2.

Comparative Example 1

A monolayer film (5) (thickness: 100 μm) was obtained in the same manner as in Example 1, except that only 100 parts of pellets of the resin composition (A) obtained in the Preparation Example 1 was used as the resin composition and the molten resin temperature of the film melting extruder was changed to 200° C.

The steam barrier properties, haze value, and viscoelasticity of the resulting monolayer film (5) were evaluated. The results are shown in Table 2.

Comparative Example 2

A monolayer film (6) (thickness: 100 μm) was obtained in the same manner as in Example 1, except that only 100 parts of pellets of the resin composition (A) was used as the resin composition, the molten resin temperature was changed to 200° C., and the Cooling roll and Cast roll temperature was changed to 30° C.

The steam barrier properties, haze value, and viscoelasticity of the resulting monolayer film (6) were evaluated. The results are shown in Table 2.

Comparative Example 3

40 parts of the pellets of the resin composition (A) obtained in the Preparation Example 1 and 60 parts of the pellets of the resin composition (D) obtained in the Preparation Example 4 were mixed in a blender. The pellet mixture was kneaded in the same manner as in Example 1 except for increasing the resin temperature to 220° C. using a twin-screw kneader (TEM-35B manufactured by Toshiba Machine Co., Ltd.) and extruded to obtain pellets of the resin composition (7).

The pellets of the resin composition (7) obtained were molded into a monolayer film (7) (thickness: 100 nm) by T-die molding using a hanger manifold T-die film melt extruding press machine having a resin melting kneader equipped with a screw having a screw diameter of 50 mm, a compression ratio of 2.5, and L/D=30 under the following conditions.
Die lip: 0.8 mm
Molten resin temperature: 230° C.
Width of T-die: 300 mm
Cooling roll: 60° C.
Cast roll: 60° C.

The steam barrier properties, haze value, and viscoelasticity of the resulting monolayer film (7) were evaluated. The results are shown in Table 2.

Comparative Example 4

Pellets of the resin composition (8) and a monolayer film (8) (thickness: 100 μm) were obtained in the same manner as in Example 2, except that the amounts of the resin composition (C) obtained in the Preparation Example 3 and the resin (D) were changed respectively to 70 parts and 30 parts, and the Cast roll temperature was 60° C.

The steam barrier properties, haze value, and viscoelasticity of the resulting monolayer film (8) were evaluated. The results are shown in Table 2.

Comparative Example 5

70 parts of the pellets of the resin composition (A) obtained in the Preparation Example 1 and 30 parts of the pellets of the resin composition (E) obtained in the Preparation Example 5 were mixed in a blender. The pellet mixture was kneaded in the same manner as in the Comparative Example 3 using a twin-screw kneader (TEM-35B manufactured by Toshiba Machine Co., Ltd.) and extruded to obtain pellets of the resin composition (9).

The pellets of the resin composition (9) obtained were molded into a monolayer film (9) (thickness: 100 μm) by T-die molding using a hanger manifold T-die film melt extruding press machine having a resin melting kneader equipped with a screw having a screw diameter of 50 mm, a compression ratio of 2.5, and L/D=30 under the following conditions.
Die lip: 0.8 mm
Molten resin temperature: 230° C.
Width of T-die: 300 mm
Cooling roll: 50° C.
Cast roll: 50° C.

The steam barrier properties, haze value, and viscoelasticity of the resulting monolayer film (9) were evaluated. The results are shown in Table 2.

Comparative Example 6

Pellets of the resin composition (10) and a monolayer film (10) (thickness: 100 μm) were obtained in the same manner as in Comparative Example 5, except that the amounts of the resin composition (A) and the resin composition (F) were changed respectively to 70 parts and 30 parts.

The steam barrier properties, haze value, and viscoelasticity of the resulting monolayer film (10) were evaluated. The results are shown in Table 2.

Comparative Example 7

Pellets of the resin composition (11) and a monolayer film (11) (thickness: 100 μm) were obtained in the same manner as in Example 2, except that the amounts of the resin composition (A) and the resin composition (G) were changed respectively to 70 parts and 30 parts.

The steam barrier properties, haze value, and viscoelasticity of the resulting monolayer film (11) were evaluated. The results are shown in Table 2.

TABLE 2

|  | Resin (weight ratio) | Film No. | Cooling roll temperature (° C.) | Thickness (μm) | Moisture permeation rate (g/m² · day) | Haze value (%) |
| --- | --- | --- | --- | --- | --- | --- |
| Example 1 | A/D (90/10) | 1 | 40 | 101 | 0.38 | 19 |
| Example 2 | A/D (70/30) | 2 | 50 | 103 | 0.36 | 18 |
| Example 3 | A/D (60/40) | 3 | 50 | 99 | 0.4 | 17 |
| Example 4 | B/D (70/30) | 4 | 50 | 102 | 0.37 | 18 |
| Comparative Example 1 | A (100) | 5 | 40 | 101 | 0.39 | 45 |
| Comparative Example 2 | A (100) | 6 | 30 | 100 | 0.51 | 19 |
| Comparative Example 3 | A/D (40/60) | 7 | 60 | 100 | 0.57 | 19 |
| Comparative Example 4 | C/D (70/30) | 8 | 60 | 99 | 0.69 | 18 |
| Comparative Example 5 | A/E (70/30) | 9 | 50 | 101 | 0.58 | 63 |

TABLE 2-continued

| | Resin (weight ratio) | Film No. | Cooling roll temperature (° C.) | Thickness (μm) | Moisture permeation rate (g/m² · day) | Haze value (%) |
|---|---|---|---|---|---|---|
| Comparative Example 6 | A/F (70/30) | 10 | 50 | 100 | 0.45 | 52 |
| Comparative Example 7 | A/G (70/30) | 11 | 50 | 102 | 0.68 | 19 |

<Discussion>

It can be seen that the films obtained using the resin composition of the present invention exhibited good steam barrier properties and excellent transparency (Examples 1 to 4).

In contrast, in the case where the amorphous alicyclic structure-containing polymer (2) was not included, the films had poor steam barrier properties and transparency (Comparative Examples 1 and 2).

In the case where the ratio of the hydrogenated 2-norbornene ring-opened polymer (1) and the amorphous alicyclic structure-containing polymer (2) was outside the range of 90/10 to 50/50 (by weight), the polymer compositions had poor steam barrier properties (Comparative Example 3).

When a hydrogenated 2-norbornene ring-opened polymer having a low boiling point in which the proportion of the repeating units originating from 2-norbornene is outside the range of 90 to 100 wt % in all repeating units was blended with the amorphous alicyclic structure-containing polymer (2), the polymer composition showed poor steam barrier properties (Comparative Example 4).

When the amorphous alicyclic structure-containing polymer obtained from a polymerizable monomer mixture in which the total amount of the 2-norbornene compounds and the dicyclopentadiene compounds is 50 wt % or more but less than 90 wt % was not included, the films had poor steam barrier properties (Comparative Examples 5 and 6).

In the case where the amorphous alicyclic structure-containing polymer having a glass transition temperature of 50° C. or more and not having a melting point was not included, the films had poor steam barrier properties (Comparative Example 7).

Example 5

Pellets of the polymer composition (1) obtained in Example 1 was molded by blow injection at a resin temperature of 280° C. and a die temperature of 120° C. to produce four bottles (1) with an external diameter of 18 mm, a height of 110 mm, an internal diameter of 14 mm, and an internal volume of 10 ml. The adsorption test, moisture permeation test, and elution test were conducted using the bottles, and the results of the property evaluation are shown in Table 3.

Example 6

Four bottles (2) were produced in the same manner as in Example 5, except for using the pellets of the polymer composition (2) obtained in Example 2. The adsorption test, moisture permeation test, and elution test were conducted using the bottles, and the results of the property evaluation are shown in Table 3.

Example 7

Four bottles (3) were produced in the same manner as in Example 5, except for using the pellets of the polymer composition (3) obtained in Example 3. The adsorption test, moisture permeation test, and elution test were conducted using the bottles, and the results of the property evaluation are shown in Table 3.

Example 8

Four bottles (4) were produced in the same manner as in Example 5, except for using the pellets of the polymer composition (4) obtained in Example 4. The adsorption test, moisture permeation test, and elution test were conducted using the bottles, and the results of the property evaluation are shown in Table 3.

Comparative Example 8

Four bottles (5) were produced in the same manner as in Example 5, except for using only the pellets of the resin composition (A) obtained in Preparation Example 1. The adsorption test, moisture permeation test, and elution test were conducted using the bottles, and the results of the property evaluation are shown in Table 3.

Comparative Example 9

Four bottles (6) were produced in the same manner as in Example 5, except for using the pellets of the polymer composition (F) obtained in Comparative Example 3. The adsorption test, moisture permeation test, and elution test were conducted using the bottles, and the results of the property evaluation are shown in Table 3.

Comparative Example 10

Four bottles (7) were produced in the same manner as in Example 5, except for using the pellets of the polymer composition (G) obtained in Comparative Example 4. The adsorption test, moisture permeation test, and elution test were conducted using the bottles, and the results of the property evaluation are shown in Table 3.

Comparative Example 11

Four bottles (8) were produced in the same manner as in Example 5, except for using the pellets of the polymer composition (H) obtained in Comparative Example 5. The adsorption test, moisture permeation test, and elution test were conducted using the bottles, and the results of the property evaluation are shown in Table 3.

Comparative Example 12

Four bottles (9) were produced in the same manner as in Example 5, except for using the pellets of the polymer composition (I) obtained in Comparative Example 6. The adsorption test, moisture permeation test, and elution test were conducted using the bottles, and the results of the property evaluation are shown in Table 3.

Comparative Example 13

Four bottles (10) were produced in the same manner as in Example 5, except for using the pellets of the polymer composition (J) obtained in Comparative Example 7. The adsorption test, moisture permeation test, and elution test were conducted using the bottles, and the results of the property evaluation are shown in Table 3.

TABLE 3

| | Bottle | Resin (weight ratio) | Adsorption rate (%) | Elution test | Shape after sterilization | Distilled water preservation rate (%) |
|---|---|---|---|---|---|---|
| Example 5 | 1 | A/D (90/10) | 0 | Good | Good | 100.00 |
| Example 6 | 2 | A/D (70/30) | 0 | Good | Good | 100.00 |
| Example 7 | 3 | A/D (60/40) | 0.01 | Good | Good | 99.95 |
| Example 8 | 4 | B/D (70/30) | 0.01 | Good | Good | 100.00 |
| Comparative Example 8 | 5 | A (100) | 0.03 | Good | Good | 99.37 |
| Comparative Example 9 | 6 | A/D (40/60) | 0.05 | Good | Bad | 98.75 |
| Comparative Example 10 | 7 | C/D (70/30) | 0.13 | Good | Bad | 98.13 |
| Comparative Example 11 | 8 | A/E (70/30) | 0.12 | Good | Good | 98.75 |
| Comparative Example 12 | 9 | A/F (70/30) | 0.1 | Good | Good | 99.38 |
| Comparative Example 13 | 10 | A/G (70/30) | 0.15 | Good | Bad | 98.75 |

<Discussion>

It can be seen that the bottles obtained using the polymer composition of the present invention exhibited a high preservation rate of distilled water after 60 days, indicating excellent properties of maintaining the concentration of the packed materials (Examples 5 to 8).

In addition, there was no distortion of the molded bottles after steam sterilization at 121° C. for 30 minutes. As a result of the "plastic medical container assay" according to the Japanese Pharmacopoeia (15$^{th}$ revision), the bottles were found to be suitable as a medical container (Examples 5 to 8).

In contrast, in the case where the amorphous alicyclic structure-containing polymer (2) was not included, the bottles showed poor adsorption properties and a lowered distilled water preservation rate after 60 days, indicating poor properties of maintaining concentration (Comparative Example 8).

In the case where the ratio of the hydrogenated 2-norbornene ring-opened polymer (1) and the amorphous alicyclic structure-containing polymer (2) was outside the range of 90/10 to 50/50 (by weight), the bottle showed poor adsorption properties and difficulty in maintaining the shape after steam sterilization (Comparative Example 9).

When a hydrogenated 2-norbornene ring-opened polymer in which the proportion of the repeating units originating from 2-norbornene is outside the range of 90 to 100 wt % of all repeating units was blended with the amorphous alicyclic structure-containing polymer (2), the bottle showed poor adsorption properties and difficulty in maintaining the shape after steam sterilization (Comparative Example 10).

When the amorphous alicyclic structure-containing polymer obtained from a polymerizable monomer mixture in which the total amount of 2-norbornene compounds and dicyclopentadiene compounds is 50 wt % or more but less than 90 wt % was not included, the bottle had poor performance of maintaining the concentration of packed materials (Comparative Examples 11 and 12).

In the case where the amorphous alicyclic structure-containing polymer having a glass transition temperature of 50° C. or more and not having a melting point was not included, the bottle showed poor performance of blocking adsorption and maintaining the shape after steam sterilization (Comparative Example 13).

The invention claimed is:

1. A polymer composition comprising (1) a crystalline norbornene-based polymer and (2) an amorphous alicyclic structure-containing polymer in a weight ratio of 90:10 to 50:50, the crystalline norbornene-based polymer (1) having a melting point of 110 to 145° C., a weight average molecular weight measured by gel permeation chromatography of 50,000 to 200,000, and a ratio of the weight average molecular weight to the number average molecular weight of 1.5 to 10.0, and obtained by ring-opening polymerization of a polymerizable monomer mixture (1) comprising 90 to 100 wt % of 2-norbornene and 0 to 10 wt % of a substituent-containing norbornene monomer, and hydrogenating the resulting polymer, and the amorphous alicyclic structure-containing polymer (2) having a glass transition temperature of 50° C. or more and not having a melting point, and obtained by polymerization of a polymerizable monomer mixture (2) comprising a 2-norbornene compound and a dicyclopentadiene compound in an amount of 50 wt % or more and less than 90 wt % in total.

2. A film obtained by molding the polymer composition according to claim 1, the film having a steam permeability of 0.40 g/m$^2$·day or less and a haze value of 20% or less when the film has a thickness of 100 μm.

3. A medical container obtained by molding the polymer composition according to claim 1.

* * * * *